Jan. 14, 1958
H. GRÖTTRUP
2,820,216
SENSING ARRANGEMENT FOR STORED INFORMATION CONCERNING
POSITIONING OF A MECHANICAL ELEMENT
Filed March 14, 1956
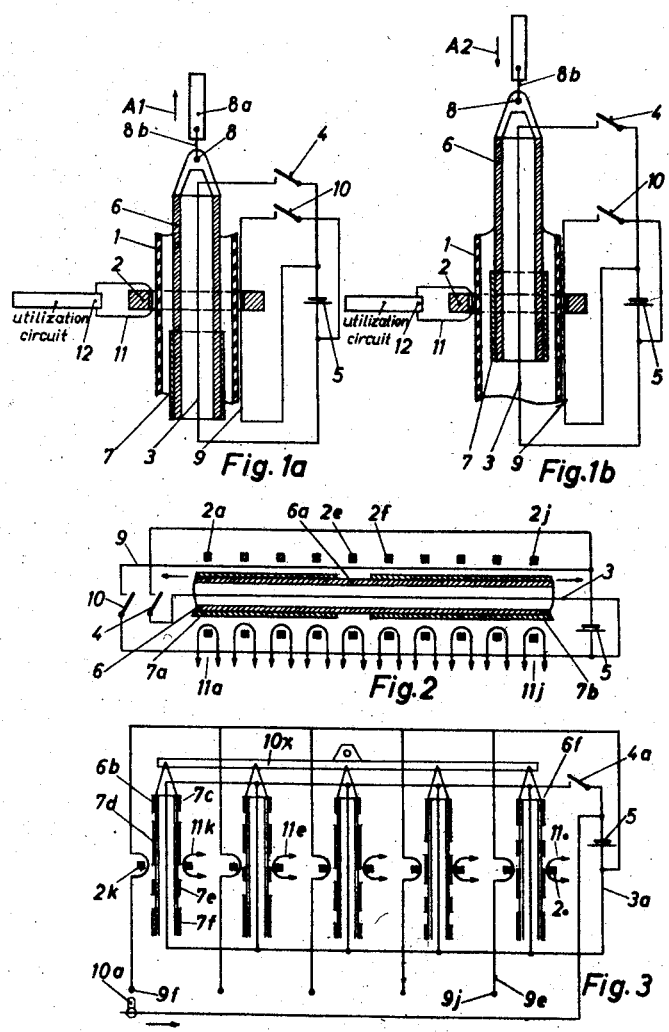
INVENTOR
H. GRÖTTRUP
BY
ATTORNEY United States Patent Office 2,820,216
Patented Jan. 14, 1958

2,820,216

SENSING ARRANGEMENT FOR STORED INFORMATION CONCERNING POSITIONING OF A MECHANICAL ELEMENT

Helmut Gröttrup, Birkenfeld, Wurttemberg, Germany, assignor to International Standard Electric Corporation, New York, N. Y., a corporation of Delaware Application March 14, 1956, Serial No. 571,508

Claims priority, application Germany March 19, 1955

7 Claims. (Cl. 340—174)

This invention relates to improvements for a sensing arrangement for stored information concerning the physical position of a mechanical element and more particularly regarding the positioning of mechanical elements in recording devices.

The physical position of a mechanical element has hitherto been indicated both mechanically and electrically. The electrical indication has been achieved by means of selsyn devices, potentiometer follow-up systems, capacitive or inductive bridge tapping arrangements and the like. The earlier form of position indicating devices included mechanically actuated electrical switches which by their condition, denoted the corresponding position of the mechanical element with which they were associated.

The disadvantage of the last mentioned arrangement lay in the relatively high amount of energy required to move the mechanical element and the switch contact and in the susceptibility of the switch arrangement to foul-up by reason of dirty contacts or mis-adjustments thereof. If information regarding the position of a mechanical element required storage over a relatively long period of time, it was considered necessary in the prior art to employ additional auxiliary storage elements for use in connection with the sensing arrangement.

The invention has for one of its aims an arrangement for indicating the position of a mechanical element by the utilization of magnetic storage elements of high remanence in which the magnetic flux is maintained over relatively long periods after magnetization, the storage elements adapted to store information magnetically concerning the position of the related mechanical element without the intervention of auxiliary storage elements.

According to a feature of the invention, there is associated with the mechanical element regarding whose position information is to be stored, a magnetic shield which is co-movable with the mechanical element and which shield influences the excitation of at least one magnetic storage element. Tubular members of a material of high magnetic remanence are preferably used as magnetic storage elements, while a correspondingly sub-divided tube of magnetically soft material is employed as a shield.

According to a further feature of the invention, a group of such magnetic storage elements is linked with the mechanical member concerning whose position information is to be stored and the shield is so designed that depending on the position of the mechanical member, only one of the magnetic storage elements can be energized by a common electromagnetic exciting means.

According to yet another feature of the invention, the magnetic storage elements are so arranged that by the corresponding design of the magnetic shield and depending upon the position of the mechanical element, a predetermined combination of the magnetic storage elements can be energized by the common exciting means; the combination including the production of a signal code made of a predetermined number of units such as marking or spacing units, etc.

Although the disclosed embodiments of the invention are applied to a device for the sensing of the position of movable elements associated with office recording machines, it is to be clearly understood that the invention is not limited to this narrow field, but may be applied wherever the problem of indicating the position of a mechanical member is presented. The invention also lends itself to a novel system of telemetering. The advantage of a sensing arrangement according to this invention rests primarily in the fact that both the sensing arrangement and the storage facility are formed in an integral or single unit. It is also possible according to the invention to cater to the requirement that mechanical members and magnetic shield members associated therewith are free to accept a new setting after magnetization of the magnetic storage elements without the destruction of the storage of the preceding setting. Further advantages which accrue from the invention are to be realized from its small dimensions, its low power requirements and low susceptability to faulty operation due to the accumulation of dirt or mis-adjustment.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1a is a schematic representation partly in section of an embodiment of the invention with a magnetic storage element in flux relation with an output detecting circuit to indicate a first physical position of a mechanical element;

Fig. 1b is a schematic representation partly in section of the embodiment shown in Fig. 1a with the magnetic shielding element in a position to isolate the storage element from the output detecting circuit, thereby to indicate another position of the mechanical element;

Fig. 2 is a schematic representation partly in section of another form of my invention which enables the evaluation of any one of ten discrete positions of a mechanical member;

Fig. 3 is a schematic representation partly in section of another form of my invention which enables the production of a telegraph code depending upon the positioning of a single associated mechanical element.

Referring now to Fig. 1a, there is shown in section a tube of insulating material 1. Tube 1 is non-magnetic and carries around the outer surface thereof a magnetic storage element 2 shaped in the form of a ring and made of a material having high magnetic remanence disposed coaxially around the tube 1. I further provide a shield carrying element 6 made of non-magnetic material. The tube 6 has a smaller diameter than tube 1 with which it is co-axial. Disposed about the periphery of a portion of the tube 6 I provide a magnetic shielding portion 7 and which portion consists of a magnetically soft material. It will be noted that the portion 7 encompasses only a portion of the axial length of the tube 6. The tube 6 is provided with a coupling 8 adapted to be attached to the movable mechanical element 8a by means of a suitable link 8b. The mechanical element 8a may be movable in the direction of the arrow A1 by suitable means, not shown since such means form no part of this invention. The showing in Fig. 1b shows the mechanical element 8a in its upward position whereas the showing in Fig. 1a discloses the mechanical element 8a in its lower or downward position. The element 8a may be moved in the direction of arrow A2 in Fig. 1b.

Returning again to Fig. 1a there is further shown an exciting battery 5 and a magnetic exciting winding 3 whose circuit to the battery is completed by the switch 4. Winding 3 is shown in a most elementary schematic form it being intended that the field which surrounds the wire 3 will set up a magnetic flux in a field surrounding the wire at right angles thereto. There is further provided a second winding 9 which is in flux producing relation with the magnetic storage element 2 and is connected to battery 5 by means of contact 10. It will be observed that the direction of the windings 3 and 9 respectively is carried to opposite terminals of the battery 5 so that the electron flow through coils 3 and 9 will be opposite. There is further shown an output winding 11 coupled between magnetic storage element 2 and a utilization circuit 12. The utilization circuit 12 is shown as a rectangle and may be of any known type.

The operation of the device thus far disclosed is as follows:

Assume that prior to the start of the storage process, the magnetic storage element 2 is so magnetized that its flux runs counter-clockwise. The tube 6 with its shield portion 7 may be moved into the position shown in Fig. 1b by the movement of the mechanical element 8a; thereafter the switch 4 is closed causing electron flow through the line 3. The shield 7 however prevents the field generated by the line 3 from having any effect on magnetic storage element 2. If however, the switch 4 were to be closed while the shield 7 is in the position shown in Fig. 1a, the counter-clockwise flux in magnetic storage element 2 which was initially present will now be overcome and a clockwise flux will be established in the storage element 2, and an output pulse will appear in line 11 having a first polarity. It will be recalled that storage element 2 is of high magnetic remanence and therefore the clockwise flux created by line 3 will be maintained. Once the storage element 2 has been magnetized in a particular direction, the tube 6 and of course its associated mechnical element 8a may move freely without affecting or destroying the stored magnetic charge in element 2.

The closure of contact 10 will cause a flux to be set up in storage element 2 opposite to that created by the closure of switch 4 and this change will be reflected in an output pulse having a second polarity and which is generated in the output coupling line 11 and the utilization circuit 12. In Fig. 1b since the storage element 2 was magnetized so that the flux direction was counter-clockwise and since the shield 7 prevented the line 3 from altering this flux pattern, the closure of contact 10 will have no effect on storage element 2 since the line 9 will tend to magnetically energize storage element 2 in a counter-clockwise direction. No output will be passed to utilization circuit 12 via the output line 11 since it is elementary that no output current is developed in a coil unless a change of magnetic flux is presented thereto. Thus the position of the tube 6 and the mechanical element 8a with which it is associated is characterized by the presence or absence of an output pulse upon the successive closure of contacts 4 and 10 as above described. The flux change which occurs in the storage element 2 and the consequent current impulse developed in the output line 11 may be arranged to be responsive only to a change brought by the closure of contact 10 by known means such for instance as a rectifier in series with the output line 11 so that an output pulse will be generated when the storage element 2 is magnetized in a first direction only, it being obvious that no output pulse will be derived when the storage element 2 is biased back to a starting or counter-clockwise position by line 9. The contacts 4 and 10 may be cyclically operated in the order mentioned when it is desired to sense the position of the element 8a.

The embodiment shown in Fig. 2 discloses structure similar to that shown in Figs. 1a and 1b with certain modifications. The tube 6 is provided with two magnetic portions 7a and 7b with a gap between the two portions indicated as 6a. Surrounding the tube 6 and fixed with respect to the movement thereof, are ten spaced magnetic storage elements 2a . . . 2j each having its associated output line 11a . . . 11j. Each output line is connected with its individual utilization device (not shown) similar to the device 12 shown in Figs. 1a and 1b. In the Fig. 2 showing the mechanical element 8a is not shown in order to maintain the drawing uncomplicated but it will be understood that the tube 6 is drawn in a direction transverse to the storage elements 2a. All other elements of the showing in Fig. 2 otherwise correspond to those shown in Fig. 1 and serve the same function. The carrier 1 is also eliminated from the showing in Fig. 2 but it will be understood that each of the storage elements 2a . . . 2j are spacedly mounted from each other. The line 3 is common to each of the storage elements 2a . . . 2j as is the line 9. It will be observed that the gap 6a will permit but a single storage element 2a . . . 2j to be subject to the influence of the line 3 and that by moving the tube 6 in either a right or a left hand direction in Fig. 2 will enable another of the storage elements 2a . . . 2j to be exposed to the energization flux of line 3 without the shielding effect of portions 7a or 7b. In the showing in Fig. 2 storage element 2e is in position to be acted upon by line 3 through the gap 6a. It will be understood that the gap 6a on tube 6 must be transportable from a position where it is in register with any of the elements 2a . . . 2j in order to record the ten discrete possible positions of the tube 6.

The operation of the structure of Fig. 2 is essentially similar to that described in connection with Figs. 1a and 1b namely that prior to the storage process the storage elements 2a . . . 2j are magnetized in a counter-clockwise direction. After the movement of the tube 6 and the positioning of the gap 6a in register with a storage member 2a . . . 2j indicative of the direction of degree of movement thereof, closure of the switch 4 and energization of the line 3 will magnetize the single storage element and a clockwise flux direction is derived. After the switch 10 is closed only that storage element will undergo a flux reversal which was in register with the gap 6a, and an output will be derived from its corresponding output line 11a . . . 11j.

Fig. 3 discloses another embodiment of my invention which is utilized for storing information regarding the position of a mechanical member and deriving from a plurality of storage members a code combination. The apparatus consists of a group of five tubes 6b . . . 6f each coupled to a common mechanical link 10x, and which link is in turn adapted to be moved by the mechanical element (not shown) with which it is to be associated. Each of the tubes 6b . . . 6f is provided with portions 7c . . . 7f and is provided with a plurality of gaps between the portions similar to the gap 6a in Fig. 2. It will be observed that the length of the corresponding portions 7c . . . 7f of the various tubes 6 are different and are purposely so. Each of the tubes has associated therewith its individual storage element 2k . . . 2o; each of the storage elements is provided with its individual output line 11k . . . . 11o as in the Fig. 2 showing. Similarly the excitation line 3a controlled by the switch 4a is provided with five parallel branches extending through each of the five tubes 6b . . . 6f so that upon closure of switch 4a the magnetic field is set up within each of the tubes 6b . . . 6f and which field will be effectively shielded from the magnetic storage elements 2k . . . 2o by the particular portions 7c . . . 7f except where a gap is in register with its cooperating storage element. There are provided a plurality of windings 9a . . . 9e each coupled to a different one of the magnetic storage elements 2k . . . 2o and each of which is adapted to be sequentially energized by means of the wiper contact 10a when said wiper contact contacts corresponding terminals 9f . . . 9j, respectively. By means of this sequential operation the condition of each of the elements 2k . . . 2o may be sampled. Thus information may be applied to the storage structure in simultaneous fashion and read out sequentially to produce a train of impulses and may be derived as mark and space impulses in a printing telegraph code after the addition of the necessary start and stop impulses. In operation, a predetermined amount of movement of the link 10x will result in a first code element being formed by the excursion of wiper 10a over the terminals 9f . . . 9g. A further movement of the link 10x will bring a new combination of portions 7d in various positions vis-a-vis, the magnetic storage elements 2k . . . 2o and upon a new excursion of the wiper 10a another code combination is formed, and so on.

The embodiments above described have outlined movement of mechanical elements in a transverse direction with respect to the storage elements. However, the invention is not limited to such transverse motion and it is within the scope of this invention to provide storage of information regarding the position of mechanical elements which rotate with respect to the magnetic storage elements. The configuration of the magnetic storage elements is not necessarily limited to an annulus, but may also be of any suitable shape.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A device of the class described comprising magnetic storage means of high remanence, output means coupled to said storage means, first means for applying to said storage means a magnetic flux having a first polarity, second means for applying to said storage means a magnetic flux having a second polarity, movable shielding means adapted to be selectively interposed between said storage means and said second flux application means, and means for sequentially operating said first and said second flux application means whereby said storage means undergoes no flux change when said shielding means is in shielding relation with said storage means and undergoes a flux change when said shielding means is out of shielding relation with said storage means.

2. A device as claimed in claim 1, wherein said storage means comprises an annulus of magnetic material and said output means comprises a utilization circuit inductively coupled to said annulus.

3. A device as claimed in claim 2, wherein said shielding means comprises a cylinder of magnetically soft material.

4. A device as claimed in claim 2, wherein said storage means comprises a plurality of spaced annular storage elements, and said output means comprises a plurality of utilization circuits, one for each of said elements, said first and said second flux application means common to each of said elements, said shielding means comprising a tube of non-magnetic material having mounted coaxially thereon a pair of tubes of soft magnetic material, said pair of tubes longitudinally spaced from each other to define a gap therebetween, the width of said gap equivalent to a distance required to shield all but a single one of said elements from said second flux application means, said tube adapted to be selectively positioned whereby said gap may be placed in opposition with any of said elements.

5. A device as claimed in claim 1, wherein said storage means comprises a plurality of annular elements, said shielding means comprises a plurality of non-magnetic tubes, one for each of said elements, and having a coating of soft magnetic material thereon, said material having a plurality of variable width gaps along the length of said tube, corresponding gaps on each of said tubes being of different widths, each tube mechanically coupled for movement with the other.

6. A device as claimed in claim 5, wherein said second flux application means comprises a plurality of parallel energizing circuits, each circuit adapted to be inductively coupled to a different one of said elements, said first flux application means comprising a plurality of parallel energizing circuits, each circuit inductively coupled to a different one of said elements, and switch means for sequentially energizing said last named circuits.

7. A device as claimed in claim 1, wherein said shield means is mechanically coupled to an element whose physical position is to be sensed.

References Cited in the file of this patent
UNITED STATES PATENTS

| | | |
|---|---|---|
| 2,403,889 | Di Toro | July 9, 1946 |
| 2,647,252 | Moore | July 28, 1953 |
| 2,712,601 | Reinwald | July 5, 1955 |